United States Patent
Choi et al.

(10) Patent No.: US 12,469,911 B2
(45) Date of Patent: Nov. 11, 2025

(54) SECONDARY BATTERY

(71) Applicant: Samsung SDI Co., Ltd., Yongin-si (KR)

(72) Inventors: Woo Hyuk Choi, Yongin-si (KR); Bong Geun Kang, Yongin-si (KR); Jun Hwan Kwon, Yongin-si (KR); Kyoung Tae Kim, Yongin-si (KR); Joung Ku Kim, Yongin-si (KR); Hyun Suk Park, Yongin-si (KR); Jun Ho Yang, Yongin-si (KR); Dong Sub Lee, Yongin-si (KR); Tae Yoon Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 480 days.

(21) Appl. No.: 17/975,404

(22) Filed: Oct. 27, 2022

(65) Prior Publication Data

US 2023/0187745 A1  Jun. 15, 2023

(30) Foreign Application Priority Data

Dec. 15, 2021 (KR) .................. 10-2021-0179507

(51) Int. Cl.
*H01M 50/179* (2021.01)
*H01M 50/107* (2021.01)
(Continued)

(52) U.S. Cl.
CPC ....... *H01M 50/179* (2021.01); *H01M 50/107* (2021.01); *H01M 50/167* (2021.01); *H01M 50/188* (2021.01); *H01M 50/548* (2021.01)

(58) Field of Classification Search
CPC ............. H01M 50/179; H01M 50/181; H01M 50/174; H01M 50/107; H01M 50/109;
(Continued)

(56) References Cited

U.S. PATENT DOCUMENTS 6,204,635 B1   3/2001 Sullivan
6,844,110 B2 * 1/2005 Enomoto ............ H01M 50/516
                                                        429/185
(Continued)

FOREIGN PATENT DOCUMENTS

CN       102299269 A   12/2011
CN       103579535 A    2/2014
(Continued)

OTHER PUBLICATIONS

Korean Office action for Application No. 10-2021-0179507, mailed Dec. 7, 2022, 6 pages.
(Continued)

*Primary Examiner* — Raymond Alejandro
(74) *Attorney, Agent, or Firm* — Womble Bond Dickinson (US) LLP

(57) ABSTRACT

A secondary battery is provided in which a first electrode (negative electrode) terminal and a second electrode (positive electrode) terminal may be concurrently (e.g., simultaneously) implemented in a cap assembly. A secondary battery includes: a case including a beading part and a crimping part; an electrode assembly physically coupled to the case and including a first electrode plate and a second electrode plate, the first electrode plate being electrically connected to the case; a first insulating gasket between the beading part and the crimping part; a cap plate coupled between the beading part and the crimping part through the first insulating gasket; a second insulating gasket extending through and coupled to the cap plate; and a rivet terminal extending through and physically coupled to the second insulating gasket, wherein the rivet terminal is electrically connected to the second electrode plate of the electrode assembly.

12 Claims, 5 Drawing Sheets

(51) Int. Cl.
*H01M 50/167* (2021.01)
*H01M 50/188* (2021.01)
*H01M 50/548* (2021.01)

(58) Field of Classification Search
CPC ............. H01M 50/548; H01M 50/547; H01M 50/167; H01M 50/188; H01M 50/186; H01M 50/184
See application file for complete search history.

(56) References Cited

U.S. PATENT DOCUMENTS

| | | | |
|---|---|---|---|
| 8,974,931 | B2 | 3/2015 | Kim |
| 9,153,805 | B2 * | 10/2015 | Lee .................. H01M 50/193 |
| 10,090,497 | B2 | 10/2018 | Kim et al. |
| 11,784,379 | B2 * | 10/2023 | Lim .................. H01M 50/531 |
| | | | 429/179 |
| 2011/0318634 | A1 | 12/2011 | Uh et al. |
| 2014/0045000 | A1 | 2/2014 | Kim |
| 2015/0236334 | A1 | 8/2015 | Lee et al. |
| 2017/0294635 | A1 | 10/2017 | Kim et al. |
| 2018/0205044 | A1 | 7/2018 | Urushihara |
| 2021/0074978 | A1 | 3/2021 | Chun |
| 2022/0123395 | A1 | 4/2022 | Kohira et al. |
| 2023/0079718 | A1 | 3/2023 | Ko |

FOREIGN PATENT DOCUMENTS

| | | |
|---|---|---|
| CN | 107293687 A | 10/2017 |
| CN | 115799591 A | 3/2023 |
| EP | 4 148 879 A1 | 3/2023 |
| JP | 2012-190779 A | 10/2012 |
| KR | 10-2005-0019359 A | 3/2005 |
| KR | 1483700 B1 | 5/2013 |
| KR | 10-1483700 | 1/2015 |
| KR | 10-2019-0049205 A | 5/2019 |
| KR | 10-2019-0093299 | 8/2019 |
| KR | 10-2019-0093360 A | 8/2019 |
| KR | 2021-0053105 A | 5/2021 |
| WO | WO 2012/121468 A1 | 9/2012 |
| WO | WO 2020/111275 | 6/2020 |

OTHER PUBLICATIONS

Extended European Search Report for Application No. 22210968.8, mailed Apr. 4, 2023, 8 pages.
Korean Notice of Allowance for Application No. 10-2021-0179507, dated Apr. 25, 2023, 7 pages.
Chinese Office Action for CN Application No. 202211556488.7, dated Aug. 22, 2025, 11 pages.

* cited by examiner

SECONDARY BATTERY

CROSS-REFERENCE TO RELATED APPLICATION

This application claims priority to and the benefit of Korean Patent Application No. 10-2021-0179507, filed on Dec. 15, 2021, in the Korean Intellectual Property Office, the entire content of which is herein incorporated by reference.

BACKGROUND

1. Field

The present disclosure relates to a secondary battery.

2. Description of the Related Art

Lithium (e.g., lithium ion) secondary batteries are utilized as power sources for hybrid or electric vehicles as well as portable electronic devices owing to several features and/or advantages including, for example, high operating voltage and high energy density per unit weight.

The secondary batteries may be classified into cylindrical, prismatic, or pouch types (kinds) in shape. For example, a cylindrical secondary battery generally includes a cylindrical case, a cylindrical electrode assembly coupled to the case, an electrolyte (optional) injected inside the case to enable movement of lithium ions, and a cap assembly coupled to one side of the case to prevent or reduce leakage of electrolyte and to prevent or reduce separation of the electrode assembly.

The above information disclosed in this Background section is only for enhancement of understanding of the background of the present disclosure and therefore it may contain information that does not constitute prior art.

SUMMARY

The present disclosure provides a secondary battery. Aspects of one or more embodiments of the present disclosure are directed towards a cylindrical secondary battery in which a positive electrode terminal and a negative electrode terminal are concurrently (e.g., simultaneously) implemented in a cap assembly.

Additional aspects will be set forth in part in the description which follows and, in part, will be apparent from the description, or may be learned by practice of the presented embodiments of the disclosure.

One or more embodiments of the present disclosure include a secondary battery including: a case including a beading part and a crimping part; an electrode assembly physically coupled to the case and including a first electrode plate and a second electrode plate, the first electrode plate being electrically connected to the case; a first insulating gasket between the beading part and the crimping part; a cap plate coupled between the beading part and the crimping part through the first insulating gasket; a second insulating gasket penetrating (e.g., extending) through and coupled to the cap plate; and a rivet terminal penetrating (e.g., extending) through and physically coupled to the second insulating gasket, and wherein the rivet terminal is electrically connected to the second electrode plate of the electrode assembly.

In one or more embodiments, the crimping part and the cap plate may be connected to each other.

In one or more embodiments, an outer surface of the crimping part and the cap plate may be connected to each other by a conductive adhesive.

In one or more embodiments, an inner surface of the crimping part and the cap plate may be connected to each other by a conductive adhesive.

In one or more embodiments, the crimping part and the cap plate may be connected to each other by a welding region.

In one or more embodiments, the welding region may be provided on a partial region of the crimping part or may be provided on an entire region of the crimping part.

In one or more embodiments, an inner insulator may be on an inner surface of the cap plate.

In one or more embodiments, the cap plate may include: a cap plate-peripheral region coupled between the beading part and the crimping part; a cap plate-inclined region extending from the cap plate-peripheral region and inclined upward; and a cap plate-center region extending from the cap plate-inclined region and coupled to the second insulating gasket and the rivet terminal.

In one or more embodiments, an outer surface of the crimping part and an outer surface of the cap plate-center region may be coplanar.

In one or more embodiments, the case may further include a bottom surface, and the bottom surface may include a safety vent.

In one or more embodiments, the second electrode plate of the electrode assembly may be electrically connected to the rivet terminal through a second lead tab.

In one or more embodiments, the first electrode plate of the electrode assembly may be electrically connected to the safety vent through a first lead tab.

DETAILED DESCRIPTION

Figure 1A:
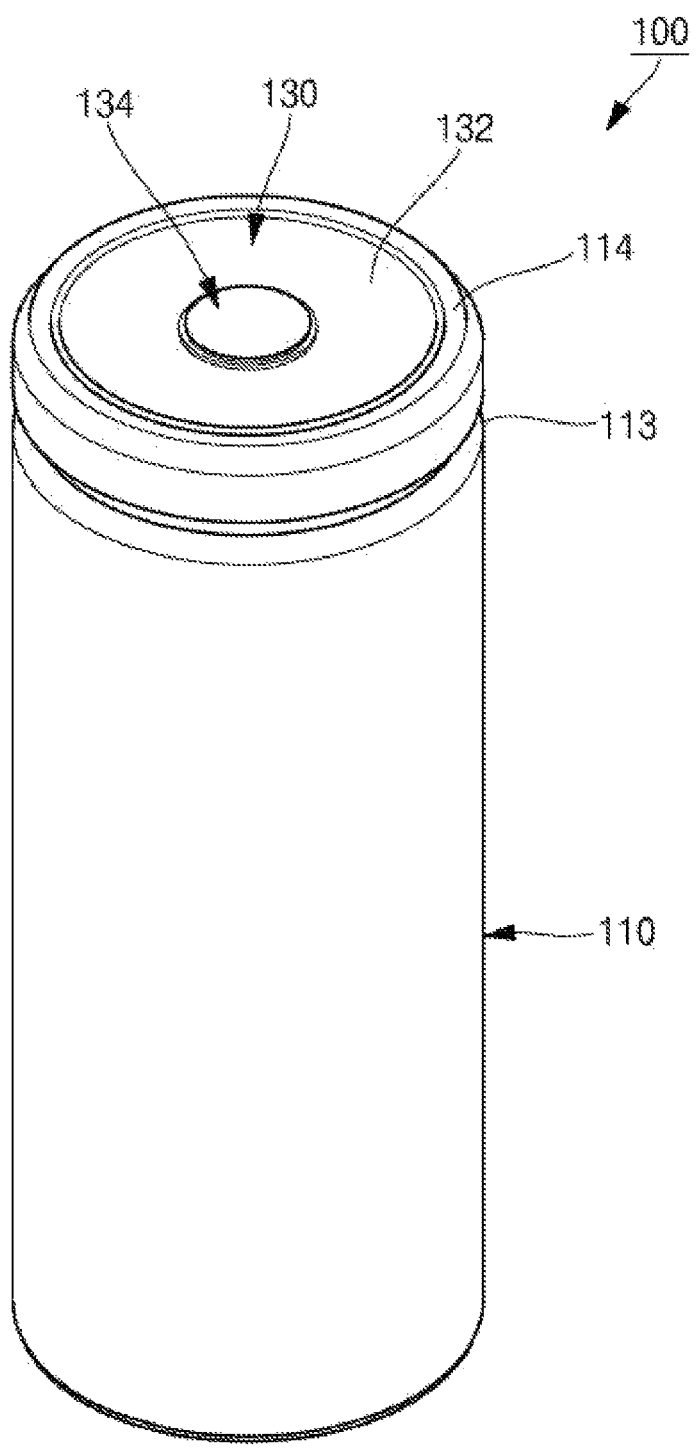
FIG. 1A is a perspective view illustrating an example secondary battery according to one or more embodiments of the present disclosure.

Hereinafter, one or more embodiments of the present disclosure will be described in more detail with reference to the accompanying drawings.

Examples of the present disclosure are provided to more completely explain the present disclosure to those skilled in the art, and the following examples may be modified in one or more suitable other forms. The present disclosure, however, may be embodied in many different forms and should not be construed as being limited to the example embodiments set forth herein. Rather, these example embodiments are provided so that this disclosure will be thorough and complete and will convey the aspects and features of the present disclosure to those skilled in the art. Accordingly, processes, elements, and techniques that are not necessary to those having ordinary skill in the art for a complete understanding of the aspects and features of the present disclosure may not be described.

In addition, in the accompanying drawings, sizes or thicknesses of various components may be exaggerated for brevity and clarity. Like numbers refer to like elements throughout, and duplicative descriptions thereof may not be provided. As used herein, the term "and/or" includes any and all combinations of one or more of the associated listed items. In addition, it will be understood that when an element A is referred to as being "on," "connected to," or "coupled to" an element B, the element A can be directly on, connected to or coupled to the element B or an intervening element C (or multiple intervening elements) may be present therebetween such that the element A and the element B are indirectly connected to each other. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprise," "include," "comprising," and "including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe one or more suitable members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, when the element or feature in the drawings is turned over, elements described as "below" or "beneath" other elements or features would then be oriented "on" or "above" the other elements or features. Thus, the example term "below" can encompass both an orientation of above and below. The device may be otherwise oriented (e.g., rotated 90 degrees or at other orientations) and the spatially relative descriptors used herein should be interpreted accordingly.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
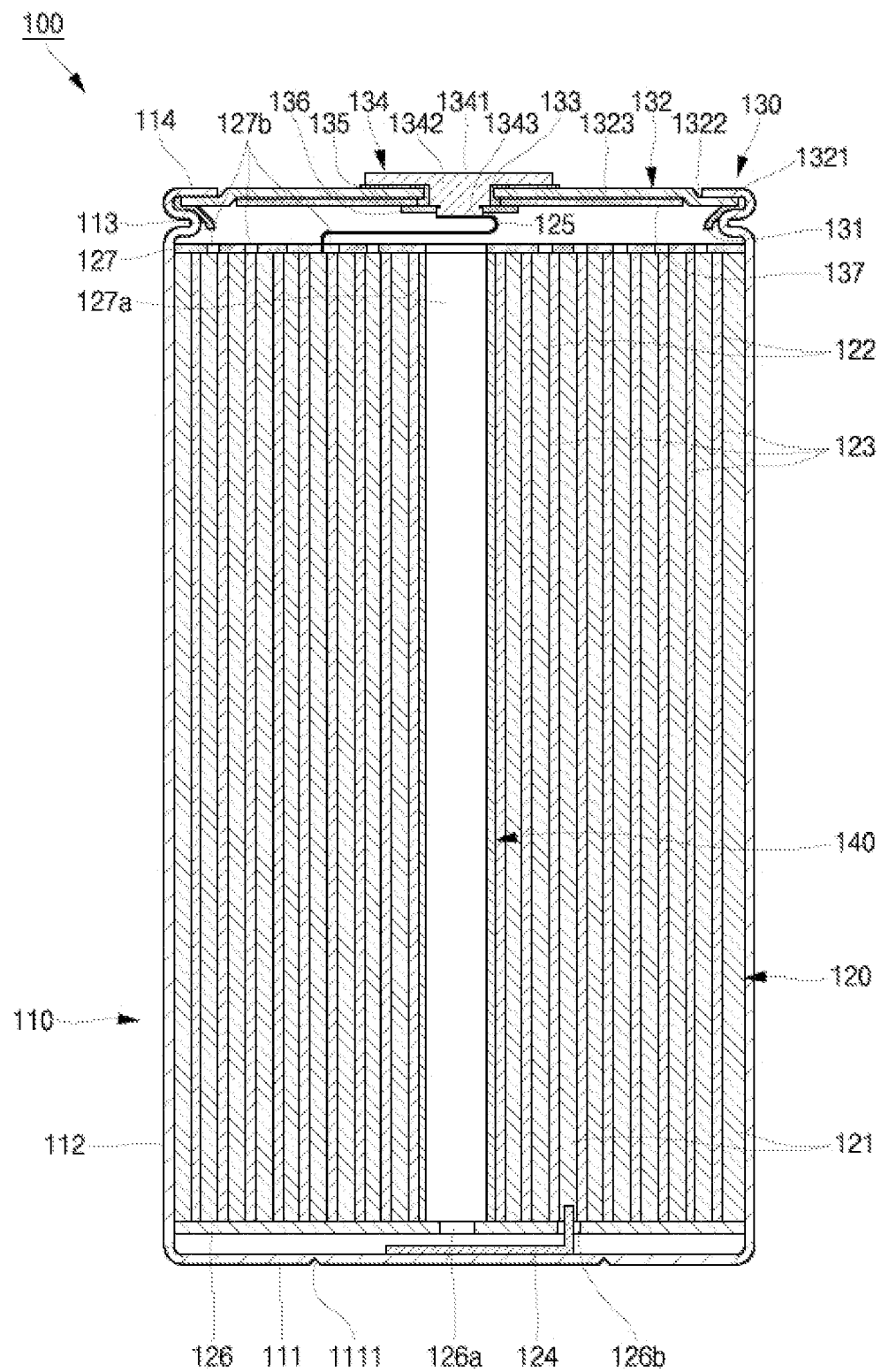
FIG. 1B is a cross-sectional view illustrating an example secondary battery according to one or more embodiments of the present disclosure.
Figure 2:
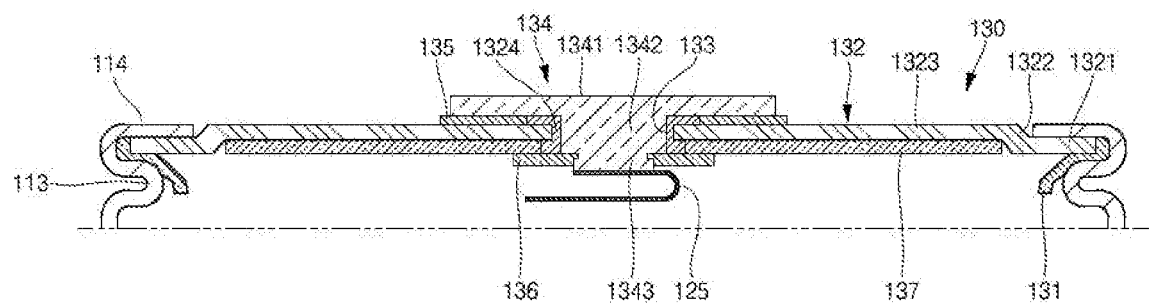
FIG. 2 is an enlarged cross-sectional view illustrating a cap assembly and a structure (e.g., a structure around or a surrounding structure) thereof in the example secondary battery according to one or more embodiments of the present disclosure.

FIGS. 1A and 1B are a perspective view and a cross-sectional view, respectively, illustrating an example secondary battery 100 according to one or more embodiments of the present disclosure. FIG. 2 is an enlarged cross-sectional view illustrating a cap assembly 130 and a structure (e.g., a structure around or a surrounding structure) thereof in the example secondary battery 100 according to one or more embodiments of the present disclosure.

As shown in FIGS. 1A, 1B and 2, the example secondary battery 100 according to one or more embodiments of the present disclosure includes a cylindrical case 110, a cylindrical electrode assembly 120, and a cap assembly 130. In some embodiments, the example secondary battery 100 may further include a center pin 140 (optional) coupled to the electrode assembly 120.

The cylindrical case 110 may include a substantially circular bottom portion 111 and a sidewall 112 extending a set or predetermined length upward from the bottom portion 111. In some embodiments, the case 110 may include or be referred to as a can, an exterior material, or a housing.

During the manufacturing process of the secondary battery 100, the upper portion of the cylindrical case 110 may be opened. Accordingly, during the assembling process of the secondary battery 100, the electrode assembly 120 may be integrated into one structure and inserted into the cylindrical case 110. Of course, thereafter, an electrolyte (optional or suitable) may be additionally injected into the cylindrical case 110.

The cylindrical case 110 may be made of steel, a steel alloy, nickel-plated steel, nickel-plated steel alloy, aluminum, or an aluminum alloy.

In one or more embodiments, in the cylindrical case 110, a beading part 113 that is recessed inwardly may be provided at the bottom of the cap assembly 130 and a crimping part 114 that is bent inward may be provided on the upper portion of the cap assembly 130 such that the cap assembly 130 is not separated to the outside (e.g., so that the cap assembly 130 may not be separated from the secondary battery 100 after assembly).

In one or more embodiments, a safety vent 1111 may be provided at the bottom 111 of the cylindrical case 110. In some embodiments, the safety vent 1111 may be provided in an approximately or substantially circular ring shape or a C shape. In some embodiments, the safety vent 1111 may include or be referred to as a notch, recess, or groove.

The electrode assembly 120 may be accommodated in the cylindrical case 110. The electrode assembly 120 may include or be referred to as an electrode, an electrode group, or a jelly roll. The electrode assembly 120 may include a negative electrode plate 121 coated with a negative electrode active material (e.g., graphite, carbon, etc.), a positive electrode plate 122 coated with a positive electrode active material (e.g., transition metal oxide(s) ($LiCoO_2$, $LiNiO_2$, $LiMn_2O_4$, etc.), and a separator 123 positioned between the negative electrode plate 121 and the positive electrode plate 122 to prevent or substantially prevent a short circuit and allow only or substantially or effectively allow only the movement of lithium ions. The negative electrode plate 121, the positive electrode plate 122, and the separator 123 may be wound in a substantially cylindrical shape. In some embodiments, the negative electrode plate 121 may include copper (Cu) foil, the positive electrode plate 122 may include aluminum (Al) foil, and the separator 123 may include polyethylene (PE) or polypropylene (PP).

In one or more embodiments, the negative electrode lead tab 124 protruding downward by a set or predetermined length may be connected to the negative electrode plate 121, and the positive electrode lead tab 125 protruding upward by a set or predetermined length may be connected to the positive electrode plate 122, or vice versa. In some embodiments, the negative electrode lead tab 124 may include copper (Cu) or nickel (Ni), and the positive lead tab 125 may include aluminum (Al). In one or more embodiments, the negative electrode lead tab 124 of the electrode assembly 120 may be welded to a bottom portion 111 of the cylindrical case 110. Therefore, the cylindrical case 110 may operate as a negative electrode. In one or more embodiments, the negative electrode lead tab 124 may be welded to the safety vent 1111 provided on the bottom portion 111 of the cylindrical case 110. Of course, in contrast, the positive electrode lead tab 125 may be welded to the bottom portion 111 of the cylindrical case 110, and in this case, the cylindrical case 110 may operate as a positive electrode.

In one or more embodiments, a first insulating plate 126 coupled to the cylindrical case 110 and having a first hole 126a formed at the center thereof and a second hole 126b formed at the outside thereof may be disposed between the electrode assembly 120 and the bottom portion 111. In one or more embodiments, the first insulating plate 126 prevents or protects the electrode assembly 120 from electrically contacting the bottom portion 111 of the cylindrical case 110. In one or more embodiments, the first insulating plate 126 prevents or protects the positive electrode plate 122 of the electrode assembly 120 from electrically contacting the bottom portion 111. In one or more embodiments, when a large amount of gas is generated due to an abnormality in the secondary battery, the first hole 126a allows the gas to rapidly move upward through the center pin 140, and the second hole 126b allows the negative electrode lead tab 124 to penetrate (e.g., extend) through and be welded to the bottom portion 111.

In one or more embodiments, the second insulating plate 127 coupled to the cylindrical case 110 and having a first hole 127a formed at the center thereof and a plurality of second holes 127b formed at the outside thereof may be interposed between the electrode assembly 120 and the cap assembly 130. In one or more embodiments, the second insulating plate 127 prevents or protects the electrode assembly 120 from electrically contacting the cap assembly 130. In one or more embodiments, the second insulating plate 127 prevents or protects the negative electrode plate 121 of the electrode assembly 120 from electrically contacting the cap assembly 130. In one or more embodiments, when a large amount of gas is generated due to an abnormality in the secondary battery, the first hole 127a allows the gas to rapidly move to the cap assembly 130, and the second holes 127b allow the positive electrode lead tab 125 to penetrate (e.g., extend) through and be welded to the rivet terminal 134. In one or more embodiments, the remaining second holes 127b serve to allow an electrolyte to quickly flow into the electrode assembly 120 in an electrolyte injection process.

In one or more embodiments, the first holes 126a and 127a of the first and second insulating plates 126 and 127 are formed to have smaller diameters than the center pin 140, thereby preventing or substantially preventing the center pin 140 from electrically contacting the bottom portion 111 or the cap assembly 130 due to an external impact.

The center pin 140 has a hollow circular pipe shape, and may be coupled to approximately the center of the electrode assembly 120. The center pin 140 may be formed of steel, stainless steel, aluminum, an aluminum alloy, or polybutylene terephthalate, but the present disclosure is not limited thereto. The center pin 140 serves to suppress or reduce deformation of the electrode assembly 120 during charging and discharging of battery, and serves as a passage for gas generated inside the secondary battery.

The cap assembly 130 may include a first insulating gasket 131, a cap plate 132, a second insulating gasket 133, and a rivet terminal 134. In one or more embodiments, the cap assembly 130 may further include an upper insulator 135, a lower insulator 136, and an inner insulator 137. In some embodiments, the cap assembly 130 may include or be referred to as a cap, a cap-up, a plate, a cover, a lid, or a shroud.

The first insulating gasket 131 may be interposed between the beading part 113 and the crimping part 114 provided in the case 110. In one or more embodiments, the upper end of the first insulating gasket 131 may be positioned between the beading part 113 and the crimping part 114, and the lower end of the first insulating gasket 131 may be positioned inside the beading part 113. In one or more embodiments, the first insulating gasket 131 may include an insulator that does not react to an electrolyte. In some embodiments, the first insulating gasket 131 may include polypropylene (PP), polyethylene (PE), ethylene propylene diene monomer (EPDM), or nitrile butadiene rubber (NBR). The first insulating gasket 131 isolates the inside and outside of the case 110 to prevent or substantially prevent an electrolyte contained inside the case from leaking to the outside and/or foreign substances (e.g., moisture or dust) from entering the inside of the case.

The cap plate 132 may be coupled between the beading part 113 and the crimping part 114 to be fixed with the first insulating gasket 131 interposed therebetween. In one or more embodiments, the cap plate 132 may include a cap plate-peripheral region 1321, a cap plate-inclined region 1322, and a cap plate-center region 1323. The cap plate-center region 1323 may include a terminal hole 1324 through which the second insulating gasket 133 and the rivet terminal 134 penetrate (e.g., extend) to be coupled, as discussed in more detail below. In some embodiments, the cap plate 132 may include aluminum, copper, nickel, iron, or an alloy thereof. In some embodiments, the cap plate 132 may include or be referred to as a cap, a cap-up, a plate, a cover, a lid, or a shroud.

The cap plate-peripheral region 1321 may be coupled between the beading part 113 and the crimping part 114. In one or more embodiments, the side surface and the inner surface (lower surface) of the cap plate-peripheral region 1321 may be in close contact with the first insulating gasket 131, and the outer surface (upper surface) of the cap plate-peripheral region 1321 may be in close contact with the crimping part 114. In one or more embodiments, the outer surface of the cap plate-peripheral region 1321 may be electrically connected to the inner surface of the crimping part 114. Accordingly, the case 110 and the cap plate 130 may have the same polarity.

The cap plate-inclined region 1322 may extend from the cap plate-peripheral region 1321 and may be inclined upward. The cap plate-inclined region 1322 may connect the cap plate-peripheral region 1321 and the cap plate-center region 1323 to each other.

The cap plate-center region 1323 may extend from the cap plate-inclined region 1322. The cap plate-center region 1323 may include a generally flat outer surface (top surface) and an approximately flat inner surface (bottom surface) opposite the outer surface. The terminal hole 1324 may penetrate (e.g., extend) through the cap plate-center region 1323. In one or more embodiments, the outer surface of the crimping part 114 and the outer surface of the cap plate-center region 1323 may be substantially coplanar.

The second insulating gasket 133 may be coupled to the terminal hole 1324. In one or more embodiments, the second insulating gasket 133 may cover an inner wall of the terminal hole 1324, a portion of the outer surface of the cap plate-center region 1323, and a portion of the inner surface of the cap plate-center region 1323. The material of the second insulating gasket 133 may be similar to that of the first insulating gasket 131. The second insulating gasket 133 may include or be referred to as a sealing gasket or a sealing insulator.

The rivet terminal 134 may penetrate (e.g., extend) through and be coupled to the second insulating gasket 133. In other words, the rivet terminal 134 may be coupled through the terminal hole 1324 of the cap plate 132.

The rivet terminal 134 may include a rivet head 1341 positioned on the outer surface of the cap plate 132, a rivet body 1342 positioned inside the terminal hole 1324, and a rivet leg 1343 positioned on (or adjacent) the inner surface of the cap plate 132. In one or more embodiments, the rivet head 1341, the rivet body 1342, and the rivet leg 1343 may be integrally provided, and may have a substantially T-shaped cross-section. In some embodiments, the rivet terminal 134 may include aluminum, copper, nickel, iron, or an alloy thereof.

As described above, the positive electrode lead tab 125 may be electrically connected to the rivet leg 1343 of the rivet terminal 134. In one or more embodiments, a positive electrode lead tab 125 may be welded to the rivet leg 1343. Accordingly, the rivet terminal 134 may have a positive electrode characteristic. In one or more embodiments, the cap plate 132 may serve as a negative electrode terminal, and the rivet terminal 134 may serve as a positive electrode terminal. For example, the cap plate 132 may have a negative electrode characteristic by being electrically connected to the crimping part 114 of the case 110, and the rivet terminal 134 may have a positive electrode characteristic by being electrically connected to the positive electrode lead tab 125. Accordingly, in the present disclosure, two terminals (a positive electrode terminal and a negative electrode terminal) are concurrently (e.g., simultaneously) provided at (e.g., in) the upper region (or portion) of the cylindrical secondary battery 100. The upper insulator 135 may be provided between the rivet terminal 134 and the cap plate 132. In one or more embodiments, the upper insulator 135 may be interposed between the rivet head 1341 and the cap plate-center region 1323.

The lower insulator 136 may be interposed between the rivet body 1342 and/or the rivet leg 1343 and the cap plate-center region 1323. In one or more embodiments, the lower insulator 136 may be interposed between the rivet leg 1343 and the second insulating gasket 133 and/or the inner insulator 137.

An inner insulator 137 may be additionally provided on the inner surface of the cap plate 132. In one or more embodiments, the inner insulator 137 may be provided in the cap plate-center region 1323. In one or more embodiments, the inner insulator 137 may be provided on the inner surface of the cap plate-center region 1323. In one or more embodiments, the inner insulator 137 may be provided from the terminal hole 1324 provided in the cap plate-center region 1323 to the cap plate-inclined region 1322.

In one or more embodiments, the insulators 135, 136, and 137 may include insulators that do not react to an electrolyte. In one or more embodiments, the insulators 135, 136, and 137 may include PP, PE, EPDM or NBR. In one or more embodiments, the insulators 135, 136, and 137 may be provided by being coated on the cap plate 132 in a liquid state and then cured, or may be provided by being separately provided and then assembled to the cap plate 132.

Figure 3:
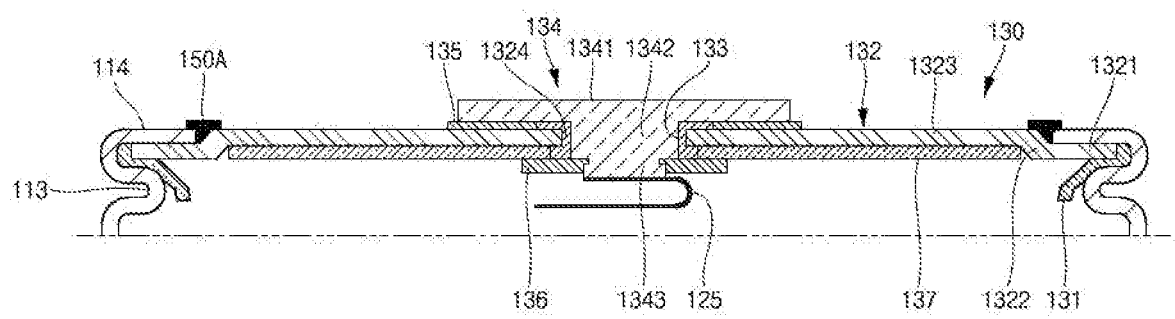
FIG. 3 is an enlarged cross-sectional view illustrating a cap assembly and a structure (e.g., a structure around or a surrounding structure) thereof in the example secondary battery according to one or more embodiments of the present disclosure.

FIG. 3 is an enlarged cross-sectional view illustrating a cap assembly 130 and a structure (e.g., a structure around or a surrounding structure) thereof in the example secondary battery 100 according to one or more embodiments of the present disclosure. In the example shown in FIG. 3, the cap plate 132 and the crimping part 114 may be electrically connected to each other by a conductive adhesive 150A. In one or more embodiments, the cap plate-peripheral region 1321, the cap plate-inclined region 1322, and/or the cap plate-center region 1323 may be electrically connected to the outer surface of the crimping part 114 by the conductive adhesive 150A. In one or more embodiments, the conductive adhesive 150A may include silver-filled epoxy or solder. In some embodiments, the conductive adhesive 150A may include a welding region provided by laser welding, resistance welding, arc welding, and/or the like.

Figure 4:
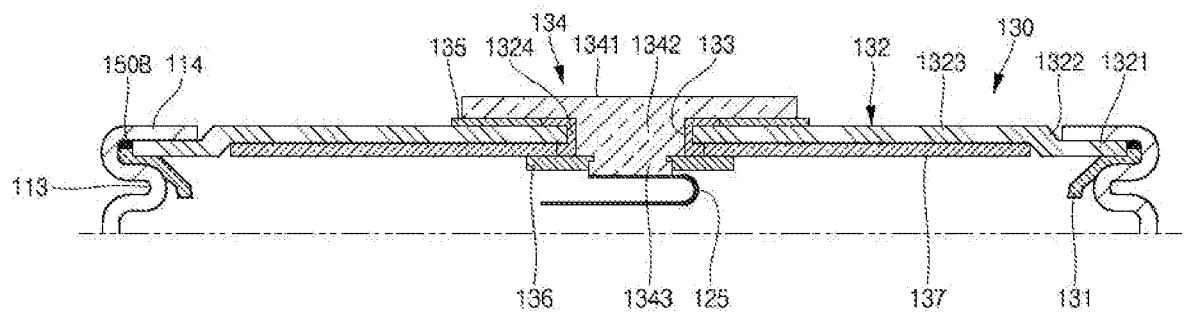
FIG. 4 is an enlarged cross-sectional view illustrating a cap assembly and a structure (e.g., a structure around or a surrounding structure) thereof in the example secondary battery according to one or more embodiments of the present disclosure.

FIG. 4 is an enlarged cross-sectional view illustrating a cap assembly 130 and a structure (e.g., a structure around or a surrounding structure) thereof in the example secondary battery 100 according to one or more embodiments of the present disclosure. In the example shown in FIG. 4, the cap plate 132 and the crimping part 114 may be electrically connected to each other by a conductive adhesive 150B. In one or more embodiments, the cap plate-peripheral region 1321 may be electrically connected to the inner surface of the crimping part 114 by the conductive adhesive 150B. In some embodiments, the conductive adhesive 150B may include silver-filled epoxy or solder. In some embodiments, the conductive adhesive 150B may include a welding region provided by laser welding, resistance welding, arc welding, and/or the like.

Figure 5:
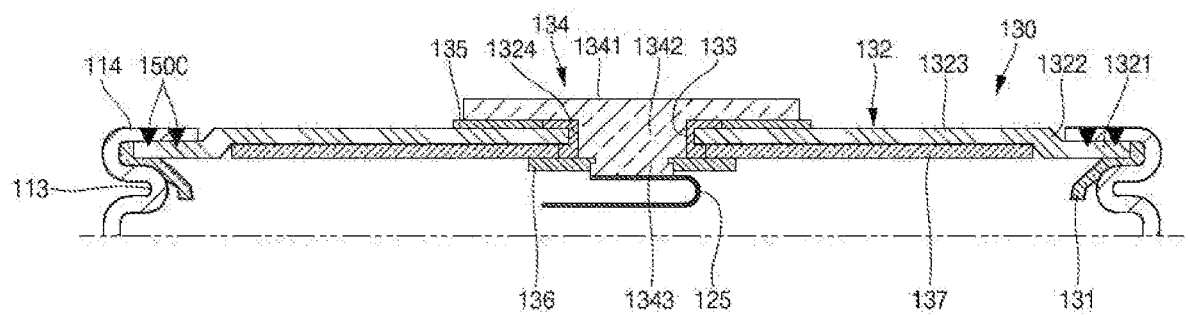
FIG. 5 is an enlarged cross-sectional view illustrating a cap assembly and a structure (e.g., a structure around or a surrounding structure) thereof in the example secondary battery according to one or more embodiments of the present disclosure.

FIG. 5 is an enlarged cross-sectional view illustrating a cap assembly 130 and a structure (e.g., a structure around or a surrounding structure) thereof in the example secondary battery 100 according to one or more embodiments of the present disclosure. In the example shown in FIG. 5, the crimping part 114 and the cap plate 132 may be electrically connected to each other by a welding region 150C. In one or more embodiments, the welding region 150C may be provided by laser beams. In one or more embodiments, as the laser beams are irradiated to the outer surface (upper surface) of the crimping part 114, a partial region of the crimping part 114 and a partial region of the cap plate-peripheral region 1321 are melted and then cooled to provide the welding region 150C, and, by the welding region 150C, the crimping part 114 and the cap plate-peripheral region 1321 may be electrically, mechanically and/or physically connected to each other.

Figure 6A:
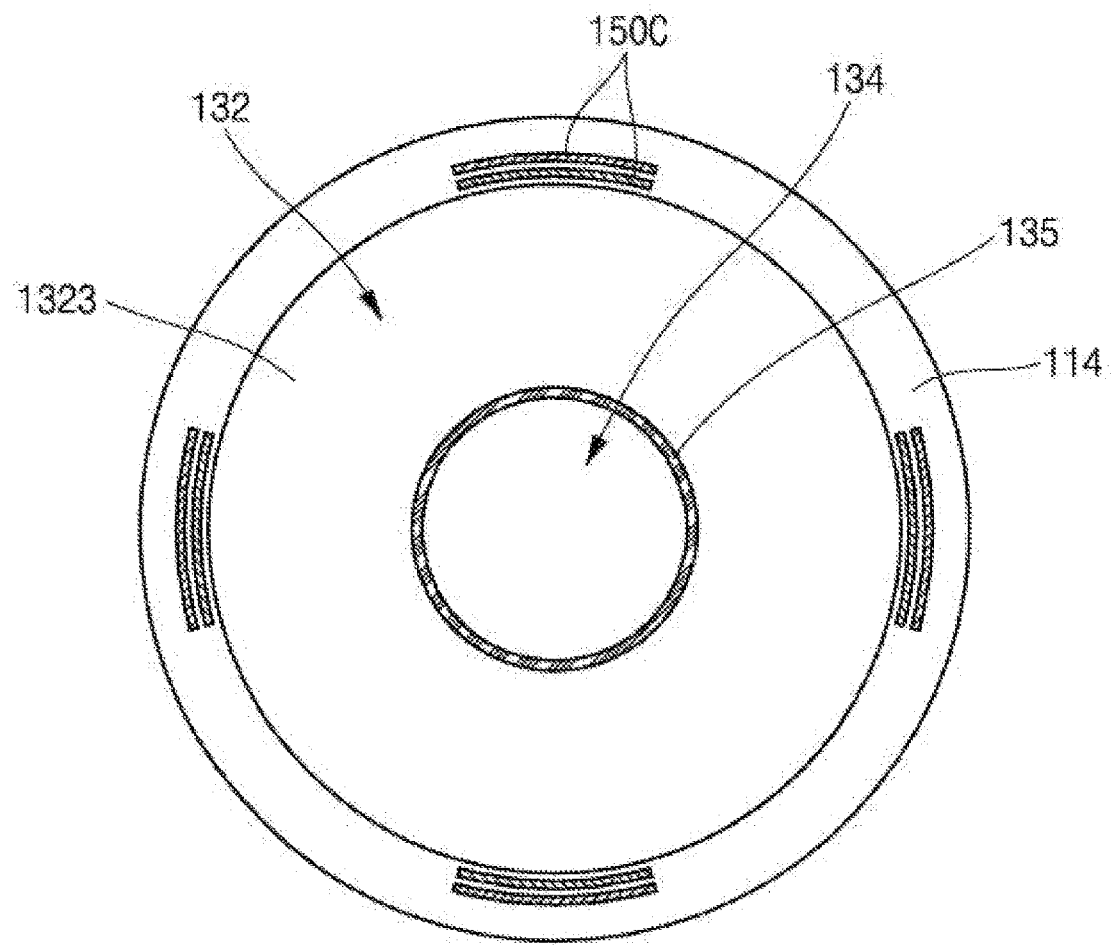
FIGS. 6A and 6B are enlarged plan views illustrating a cap assembly and a structure (e.g., a structure around or a surrounding structure) thereof in the example secondary battery according to one or more embodiments of the present disclosure.
Figure 6B:
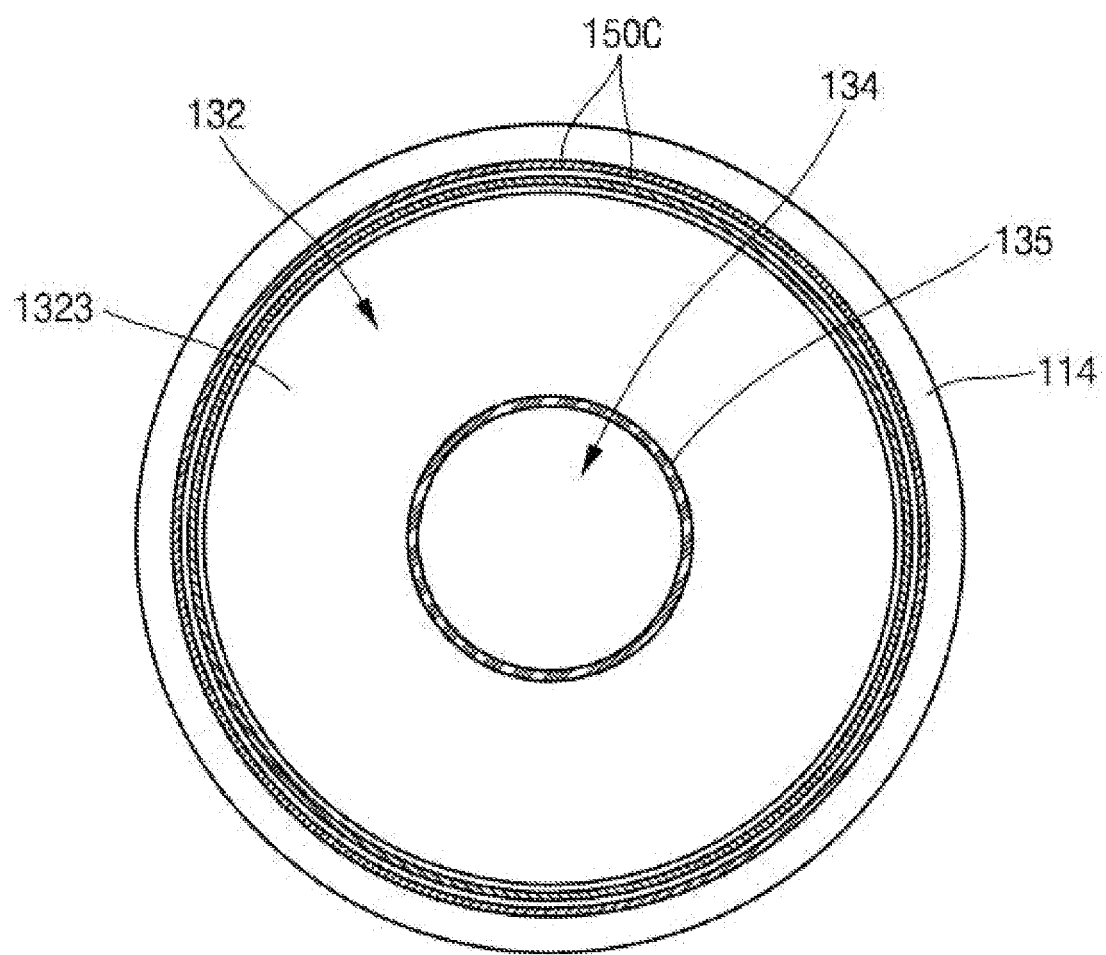

FIGS. 6A and 6B are enlarged plan views illustrating a cap assembly 130 and a structure (e.g., a structure around or a surrounding structure) thereof in the example secondary battery 100 according to one or more embodiments of the present disclosure.

As shown in FIG. 6A, the welding region 150C provided by the laser beams may be provided at four portions at intervals of approximately 90° from the outer surface of the crimping part 114. In one or more embodiments, at each portion, the welding region 150C may be provided in the form of two lines. In one or more embodiments, each welding region 150C may be provided in the form of an arc.

As shown in FIG. 6B, the welding region 150C provided by the laser beams may be provided on the entire outer surface of the crimping part 114 in the form of a circular ring. In one or more embodiments, the welding region 150C may be provided in the form of two circular rings.

As described above, the present disclosure provides a cylindrical secondary battery in which a negative electrode terminal and a positive electrode terminal are concurrently (e.g., simultaneously) implemented in a cap assembly.

As used herein, the term "substantially," "about", and similar terms are used as terms of approximation and not as terms of degree, and are intended to account for the inherent deviations in measured or calculated values that would be recognized by those of ordinary skill in the art. "Substantially" as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" may mean within one or more standard deviations, or within +30%, 20%, 10%, 5% of the stated value.

Further, the use of "may" when describing embodiments of the present disclosure refers to "one or more embodiments of the present disclosure."

In the present specification and unless otherwise, when an element is spherical or circular, "diameter" indicates the spherical or circular diameter of the element, and when the element is non-spherical or non-circular, the "diameter" indicates a major axis length of the element.

While the foregoing embodiments are illustrated for carrying out the example secondary batteries according to the present disclosure, the present disclosure is not limited to the illustrated embodiments. It will be understood by a person skilled in the art that one or more suitable changes in form and details may be made to the described embodiments without departing from the spirit and scope of the present disclosure as defined by the following claims and equivalents thereof.

What is claimed is:

1. A secondary battery comprising:
   a case comprising a beading part and a crimping part;
   an electrode assembly physically coupled to the case and comprising a first electrode plate and a second electrode plate, the first electrode plate being electrically connected to the case;
   a first insulating gasket between the beading part and the crimping part;
   a cap plate coupled between the beading part and the crimping part through the first insulating gasket;
   a second insulating gasket extending through and coupled to the cap plate; and
   a rivet terminal extending through and physically coupled to the second insulating gasket, and
   wherein the rivet terminal is electrically connected to the second electrode plate of the electrode assembly.

2. The secondary battery of claim 1, wherein the crimping part and the cap plate are connected to each other.

3. The secondary battery of claim 1, wherein an outer surface of the crimping part and the cap plate are connected to each other by a conductive adhesive.

4. The secondary battery of claim 1, wherein an inner surface of the crimping part and the cap plate are connected to each other by a conductive adhesive.

5. The secondary battery of claim 1, wherein the crimping part and the cap plate are connected to each other by a welding region.

6. The secondary battery of claim 5, wherein the welding region is provided on a partial region of the crimping part or is provided on an entire region of the crimping part.

7. The secondary battery of claim 1, wherein an inner insulator is on an inner surface of the cap plate.

8. The secondary battery of claim 1, wherein the cap plate comprises:
   a cap plate-peripheral region coupled between the beading part and the crimping part;
   a cap plate-inclined region extending from the cap plate-peripheral region and inclined upward; and
   a cap plate-center region extending from the cap plate-inclined region and coupled to the second insulating gasket and the rivet terminal.

9. The secondary battery of claim 8, wherein an outer surface of the crimping part and an outer surface of the cap plate-center region are coplanar.

10. The secondary battery of claim 1, wherein the case further comprises a bottom surface, and the bottom surface comprises a safety vent.

11. The secondary battery of claim 1, wherein the second electrode plate of the electrode assembly is electrically connected to the rivet terminal through a second lead tab.

12. The secondary battery of claim 10, wherein the first electrode plate of the electrode assembly is electrically connected to the safety vent through a first lead tab.

* * * * *